United States Patent [19]
Call

[11] Patent Number: 5,913,210
[45] Date of Patent: Jun. 15, 1999

[54] METHODS AND APPARATUS FOR DISSEMINATING PRODUCT INFORMATION VIA THE INTERNET

[76] Inventor: Charles G. Call, Four Pheasant Run, Hingham, Mass. 02043

[21] Appl. No.: 09/049,426

[22] Filed: Mar. 27, 1998

[51] Int. Cl.⁶ .............................. G06F 15/163; G06F 5/00
[52] U.S. Cl. .................... 707/4; 707/3; 707/10; 707/513; 707/524; 705/20; 705/23; 395/200.31
[58] Field of Search ........................... 707/3, 4, 10, 513, 707/524; 705/20, 23; 395/200.31

[56] References Cited

U.S. PATENT DOCUMENTS

| | | | |
|---|---|---|---|
| 5,774,874 | 6/1998 | Veeneman et al. | 705/27 |
| 5,791,991 | 8/1998 | Small | 463/41 |
| 5,804,803 | 9/1998 | Cragun et al. | 235/375 |
| 5,832,449 | 11/1998 | Cunningham | 705/3 |
| 5,845,259 | 11/1998 | West et al. | 705/14 |

*Primary Examiner*—Paul V. Kulik
*Assistant Examiner*—Jean R. Homere

[57] ABSTRACT

An Internet system for delivering information about products from the source of those products, typically the manufacturer, to those who need that information, such as product resellers and consumers. The system employs a product code translator, which may be implemented by one or more servers accessed via the Internet. The product code translator stores cross-references between product codes and the address of Internet resources which provide information about the products designated by the codes. Web pages produced by online resellers may display lists of products in response to search requests from customers, and provide the customer with detailed information about any listed product by incorporating links to the product information made available by the participating manufacturers using the cross-referenced addresses provided by the product code translator. Searchable databases may be complied by indexing product description data which is retrieved from the manufacturers' Internet sites using the Internet addresses provided by the product code translator.

14 Claims, 2 Drawing Sheets

METHODS AND APPARATUS FOR DISSEMINATING PRODUCT INFORMATION VIA THE INTERNET

FIELD OF THE INVENTION

This invention relates to methods and apparatus for disseminating information about products manufactured and distributed through commercial channels.

BACKGROUND AND SUMMARY OF THE INVENTION

Manufacturers must provide information about their products to resellers, consumers, and others. Resellers need product information to select, promote and support the products they distribute. Consumers need information about available products to make informed buying choices. Advertisers, product analysts, manufacturer's representatives, shippers, and others also need information about the goods with which they deal.

Under current practices, product information typically originates with manufacturers and is primarily distributed in conventional print media advertising and product packaging. This information is often incomplete, difficult to update, and available only to a limited distribution. While the advent of the World Wide Web has permitted manufacturers to make detailed, up-to-date product information available via the Internet, the information describing a specific product is often difficult to locate, particularly when the URL (uniform resource locator) of the manufacturer's website is not known.

It is the principle object of the present invention to facilitate the transfer of information about products from manufacturers or suppliers to resellers, customers, and any others who need or desire that information.

The present invention employs an Internet resource, called a "product code translator," for storing cross-references between universal product codes identifying specific products and Internet addresses specifying the locations at which information about these products may be obtained. In accordance with the invention, the cross-references are transferred from participating manufacturers to the product code translator using a product code registration process. The transferred cross-references specify the universal product codes assigned to the participating manufacturers, such as the U.P.C. and EAN codes widely used in retail stores for barcode scanning at checkout counters. The centrally stored cross-references thus correlate sets of universal product codes with the Internet addresses where information can be obtained about the products designated by those codes.

Utilizing the principles of the invention, resellers, potential customers, analysts, service and support personnel, end-users and others can obtain and use detailed, accurate and up-to-date information about any product of interest made available in this way by a participating manufacturer. Online resellers can display lists of products in response to search requests from customers, and provide the customer with detailed information about any listed product by incorporating links to the product information made available by the participating manufacturers. Searchable databases may be readily compiled by obtaining and indexing product description data which is retrieved from the manufacturers' Internet sites using the Internet addresses provided by the product code translator.

These and other objects, features and advantages of the present invention will be made more apparent through a consideration of the following detailed description of a preferred embodiment of the invention. In the course of this description, frequent reference will be made to the attached drawings.

DETAILED DESCRIPTION

Figure 1:
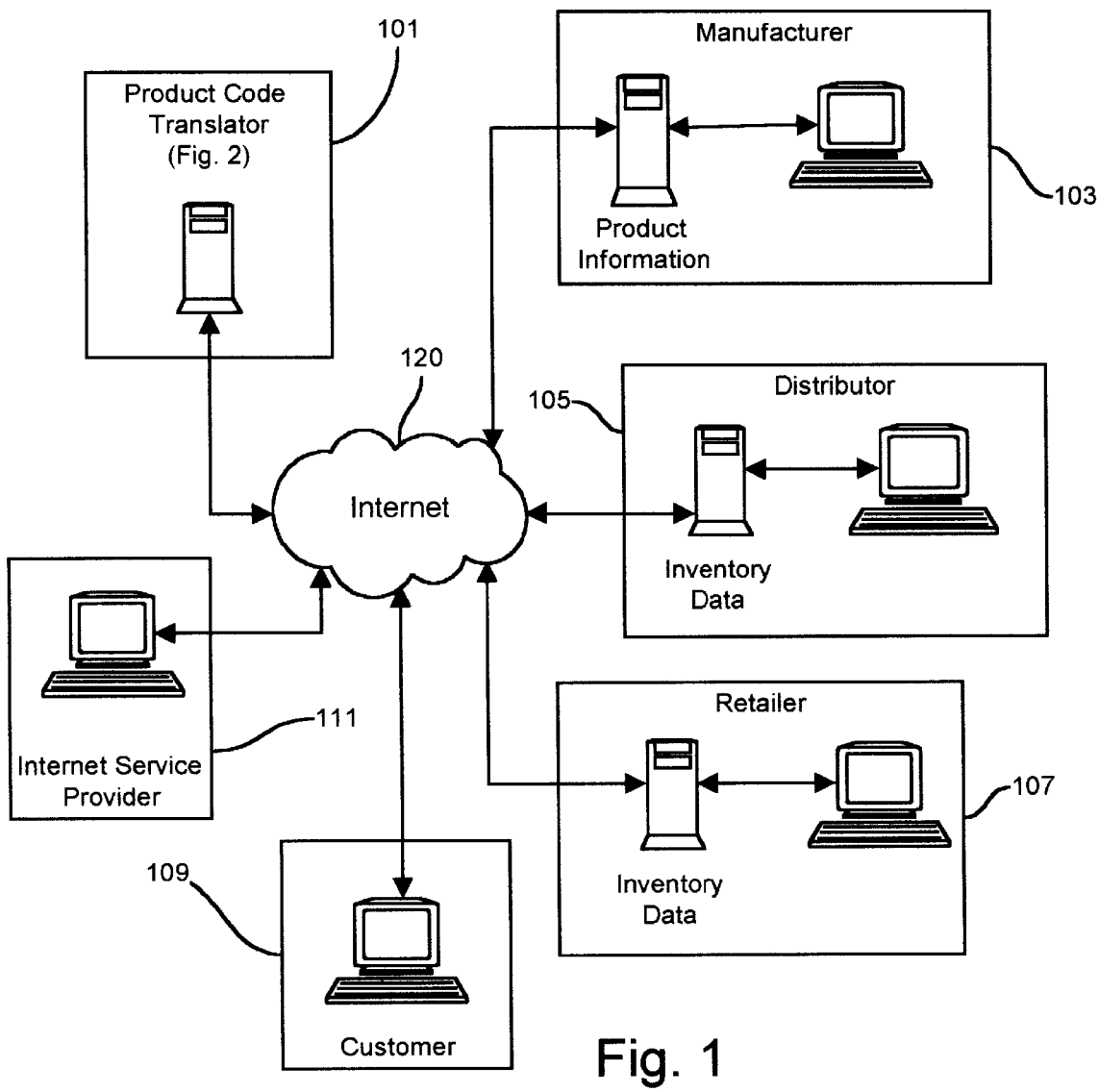
FIG. 1 is a schematic block diagram illustrating various instrumentalities which make use of the invention interconnected via the Internet.

The present invention takes advantage of two existing and highly successful technologies: the Internet and the universal product code system. In accordance with the present invention, the Internet is employed to provide low cost, worldwide, bi-directional communication which enables product information to be requested by and sent to any person or firm using one or more universal product codes as information access keys. The universal product code system is in widespread use to uniquely identify each of the thousands of different suppliers and millions of different items that are warehoused, sold, delivered and billed throughout commercial channels of distribution. In accordance with the invention, a product code translator which may be accessed via the Internet provides information enabling the translation of universal product codes into the associated Internet addresses at which information about the products specified by those product codes may be obtained.

The present invention enables the retrieval of information about products from the source of those products, typically the manufacturer, by those who need that information, such as resellers and consumers. In accordance with the invention, any person or firm having access to the Internet and knowing the universal product code for a product may obtain information about that product from the participating manufacturer which supplies that product. The system employs a product code translator, which may be implemented by a plurality of servers but which is illustrated by the single resource seen at 101 in FIG. 1. The product code translator is accessed via the Internet to perform a translation of specified universal product codes into the corresponding Internet addresses from which information about the designated products can be obtained.

The product code translator 101 stores cross-references between product codes and Internet addresses. The product codes and the Internet addresses are provided by or on behalf of participating manufacturers and suppliers, such as the manufacturer illustrated at 103 in FIG. 1. These cross-references may then be retrieved from the cross-reference resource 101 by resellers, prospective buyers, as illustrated by the distributor 105, the retailer 107 and the customer 109 seen in FIG. 1. Internet Service Providers, as illustrated by the ISP 111 in FIG. 1, may also utilize the data provided by the product code translator 101 to provide a variety of services and functions.

Before further describing how these entities function within the system, it will be useful to clarify some of the terms which will be used in this specification:

The term "universal product codes" (lower case) is used to indicate standardized industry or inter-industry codes used to designate items, packages and services made, used, leased or sold in commerce. The term thus includes the Universal Product Codes ("U.P.C.s") used by suppliers in the United States and Canada and managed by the Uniform Code Council, Inc., 8163 Old Yankee Road, Dayton, Ohio 45458; the EAN codes used by suppliers outside the U.S. and Canada under the general direction of EAN International, rue Royale 145, 1000 Bruxelles—Belgium; and any other multi-industry or single industry standard product designation system.

The term "manufacturer" will be used to refer to manufacturers, suppliers, vendors, licensors and others to whom sets of universal product codes have been assigned, or their agents. Typically, this assignment takes the form of the designation of a particular value for a portion of the universal product code which is reserved for exclusive use by a particular manufacturer. For example, the entity to which a specific six-digit "company-identifier" portion of a 12-digit numeric U.P.C. code has been assigned is a "manufacturer" as that term is used in this specification.

The term "product" is used to refer to a kind of item which is uniquely identified a single universal product code, as opposed to a specific individual item of that kind. For example, a specific U.P.C. code is assigned by the manufacturer, Hershey Foods Corp., to 'Reese's Creamy Peanut Butter" as packaged in 510 gram containers (a "product") whereas a different U.P.C. code is assigned to the same peanut butter packaged in containers of a different size (a different "product").

The term "Internet address" will be used to refer to the all, or a significant part of, a reference to a resource on the Internet. Such a reference may take the form of a numerical IP address or an alphanumeric Uniform Resource Locator ("URL") which may identify a file on a specified machine, a database query, a specific command output, or some other accessible Internet resource. Thus, the term "Internet address" includes such things as a specific 32-bit address of a specific computer connected to the Internet, written in decimal as "123.040.212.002"; a domain name such as "patentsoft.com" which can be resolved into a numerical IP-address using a domain name server; the URL of a file accessible via the Internet, such as "flp://www.sample.com/directory/filename.xxx"; a URL identifying a query processing script with passed parameters, such as "http://xxx.yyyy.com/cgi/search%01234567890123"; or an email address such as "847563@manufacturer.com".

The Product Code Translator

Figure 2:
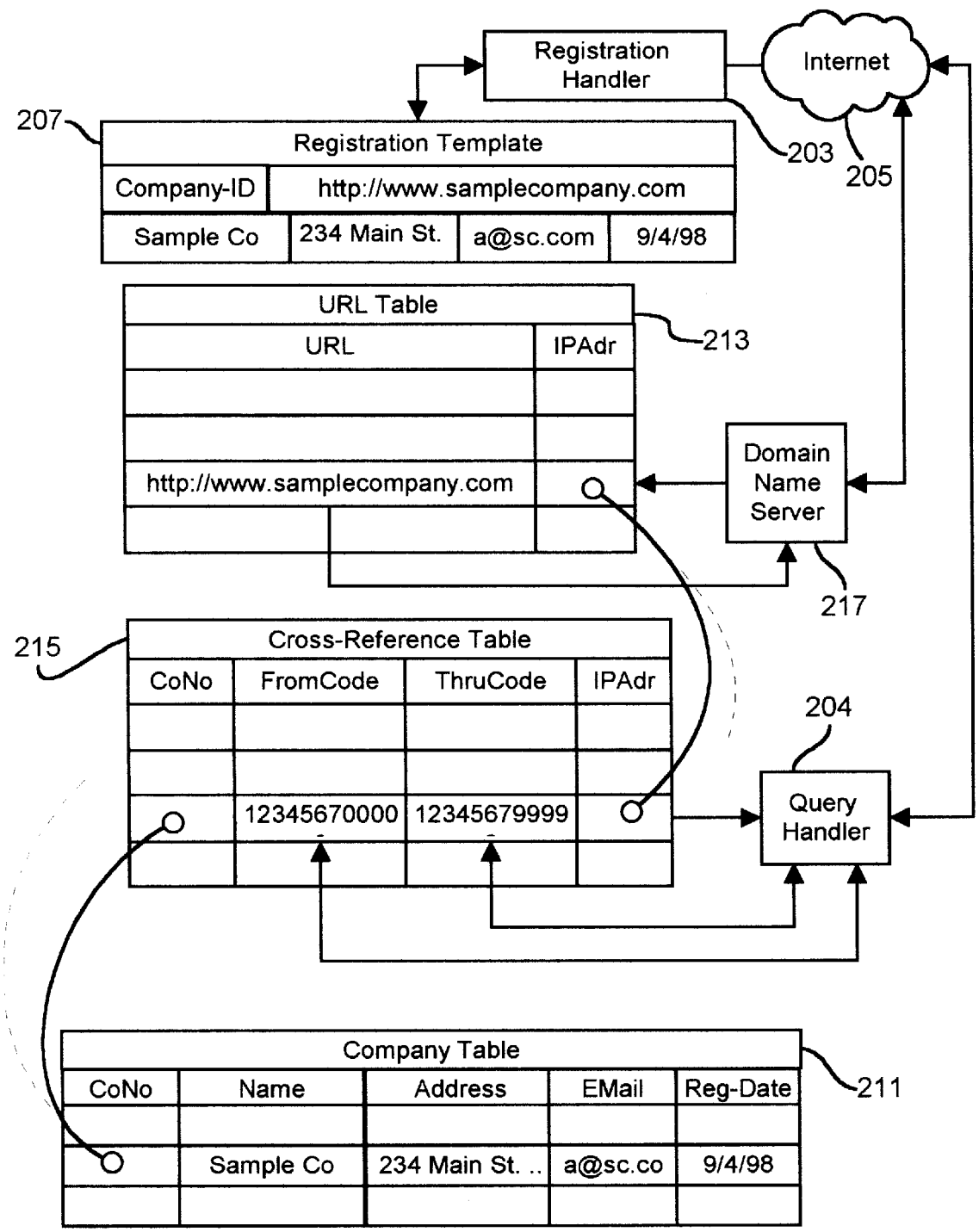
FIG. 2 is a diagram illustrating the interrelationship of the principle data structures used to implement a product code translator of the type contemplated by the invention.

The product code translator seen at 101 in FIG. 1 performs two primary functions illustrated in FIG. 2: (1) its registration handler 203 accepts cross-references submitted by manufacturers which relate their assigned universal product codes to associated Internet addresses where information relating to their products may be obtained, and (2) its query handler 204 accepts queries via the Internet 205, each query including all or part of one or more universal product codes, and returns the Internet addresses which can be used to obtain information about the products identified by those codes. The product code translator 101 may also advantageously perform other functions, examples of which are described below.

As seen in FIG. 1, the product code translator 101 may be advantageously implemented by a server computer which stores information in a relational database consisting of the tables depicted in FIG. 2. If desired, the product code translator 101 may be implemented with a plurality of "mirrored" servers at different locations, or clustered servers at the same location containing the same cross-referencing data to share the processing burden and provide redundant fault-tolerant reliability. In addition, different servers or sets of mirrored or clustered servers may be used to process different assigned subsets of the gamut of universal product codes. Whether one or many servers is used, each may be preferably implemented using conventional server hardware and conventional server operating system software, such as Microsoft NT Server, Netscape Application Server, SCO Unixware, Sun Enterprise Server, and the like.

The registration handler process 203, which may be implemented on a server which stores cross-references, or on a separate server operated by a central registration authority, receives each registration submission via the Internet 205 to create an incoming registration data illustrated by the data template record 207. The registration template record 207 includes several fields: an Company-ID field which holds the company-identifier portion of a universal product code in EAN format; a URL field which holds the Uniform Record Locator constituting the "base address" at which information can be retrieved about products designated by those universal product codes, company information fields which include the company's; name, mailing address and email address fields so that the manufacturer submitting the registration can be identified and contacted; and a date field which specifies the date upon which the registration was first made.

The registration handler 203 may obtain the submitted data needed to create the registration template record in a variety of ways, such as accepting a HTML web page form completed and submitted via the Internet by a registrant, processing an incoming email message containing the necessary information, or receiving the needed information by telephone or regular mail.

The registration handler process preferably incorporates a mechanism or procedure for insuring that the registrant has the authority to create and alter the information being supplied. A variety of methods for enhancing the security of the registration process may be employed, including the issuance of a password at the time a range of universal product codes is first registered, with the requirement that the same password be thereafter provided by anyone who seeks to alter the information originally provided with respect to any product code within that previously registered range. The registration procedure may also require each registrant to provide an email contact address to which an email message of predetermined content is sent after the initial registration form is completed, to which the registrant must respond within a predetermined time to verify the registration. Any attempt thereafter to change the contact email address results in a message being sent to the originally registered email contact address advising that an attempt is being made to alter the registration. Finally, email confirmation may be requested from the email address registered with InterNIC for the URL to which universal product codes are to be linked. This step confirms that the person attempting a registration in fact has authority to link to that host computer and provides an additional safeguard against unauthorized submissions.

Instead of maintaining a user name and password database, the registration handler can use a database of certificates, such as Certificate Server available from Netscape, to create, sign, and manage certificates for all participating manufacturers, configuring other servers to accept only authorized user certificates. A scalable database may be used to store the status of each certificate, and the issuance and revocation of certificates can be centrally administered from the product code translator or a separate registration authority. Similar password, certificate or digital signature protection schemes may be used to provide access to certain data or to data in certain forms only to authorized requesters.

The information contained in the incoming registration template 207 is used to create records (rows) in three separate tables in the relational database: a company table 211, a URL table 213 and a cross-reference table 215. As seen in FIG. 2, the company table 211 includes a numerical company number field CoNo which is also present in the cross-reference table 215 so that each cross-reference table row can be related to a particular company description record in the company table which has the same CoNo value. The key field CoNo establishes a one-to-many relationship between the company table 211 and the cross-reference table 215 since a participating company identified by a unique CoNo value may register more than one set of universal product codes, potentially associated with different IP-addresses, requiring more than one row in the cross-reference table 215.

The Company-ID field in the registration template record is used to complete two fields, FromCode and ThruCode, in a row in cross-reference table 215. These fields specify a range of one or more consecutive universal product codes. Both of these two fields preferably stores a 64-bit integer which specifies a 14 decimal digit universal product code drawn from the global pool of 14-digit numbers which includes the U.P.C., EAN-13 and SCC-14 codes. In this way, all three coding systems can be accommodated by the cross-reference table 215; for example, a 12-digit U.P.C. number 7 12345 12345 9 is the same as the 13 digit EAN number 07 12345 12345 9 and the same as the 14 digit SCC-14 number 0 07 12345 12345 9. If the U.P.C. six digit company identifier 7 12345 is specified in the registration template Company-ID field, the FromCode field of the cross-reference table record would be loaded with the number 71234500000 to specify the lowest valued universal product code cross-referenced to the corresponding IP address in the IPAdr field of the table 215, and the ThruCode field would be loaded with 71234599999 to specify the highest valued universal product code cross-referenced to that IP address. The use of the low-value/high-value range specification fields in each row of the cross-reference table 215 permits different ranges of universal product codes having the same Company-ID value to be associated with different Internet addresses in the IPAdr field of the cross-reference table 215, thus enabling a single manufacturer having a single assigned Company-ID value to store information about different products designated by different sets of its universal product codes on different Internet servers, or to cross-reference non-continuous sets of universal product codes to the same or different servers. Note further that a manufacturer need not cross-reference all of its available assigned universal product codes, but may omit unused codes or codes designating products for which no information is to be made available.

The IP-address field in each row of the cross-reference table 215 holds a 32-bit IP address used to route Internet data packets to a destination computer using the TCP/IP protocol. The 32-bit IP address value in the cross-reference table 215 is obtained from the IP address field of the URL table 213, and that 32-bit address value is prefetched by querying a conventional domain name server (DNS) seen at 217 assigned to the cross-reference resource 101. The DNS 217 translates the alphanumeric URL in the URL field of the URL table 213 into the current 32-bit bit IP address used by Internet routers to guide data packets to the proper destination computer. The alphanumeric URL in the URL field of the URL table 213 is supplied via the registration template 207 when Internet location of the manufacturer's product description data is supplied during the registration process.

The separate URL table 213 has a one-to-many relationship to the cross-reference table 215 and uses the 32-bit IP address value as the relational key. This arrangement allows a single URL base address to be shared by a plurality of different manufacturers. Thus, for example, a single Internet service provider (ISP) may act as a shared Internet resource for storing data about a products originating from many different manufacturers. It is accordingly unnecessary for each manufacture operate its own server or have its own assigned URL. Instead, a manufacturer may place its product descriptions on any server having an assigned Internet address. Note that it is further unnecessary for the manufacturer to have, or supply, an assigned URL rather than a numerical IP address; however, since corresponding URL's are ordinarily available and easier to remember, and because it may be desirable to later change numerical IP addresses while retaining the same URL, the use of URL's for registration is preferred. Note also that, because URL/IP address assignments may be added, altered or deleted on a daily basis by InterNIC (the URL assignment authority), updates to the DNS tables should also be reflected by automatic updates to the cross-reference table IP-Address fields. In this way, a change in URL/IP address assignments propagated in the DNS system require no additional action on behalf of the manufacturers to insure the continuing ability of the product code translator to produce the appropriate new IP addresses in response to universal product code queries.

With the foregoing as background, the registration and query/response functions performed by the product code translator may by summarized as follows: each participating manufacturer, or someone acting on its behalf, submits a registration which generates an incoming registration template 207 containing information about the registering manufacturer, including an identification of the universal product codes which designate products for which information is to be made available, together with the URL which specifies the Internet resource which will make that product information available.

The supplied URL is stored in the URL Table 213 and converted into a numerical IP address in the IPAdr field of the URL Table 213 using an available domain name server 217. This 32 bit IP address is stored in the IPAdr field of the cross-reference record (row) in table 215, along with a specification of the universal product codes of the products described by information which is available at this IP address, the range of codes being specified by the values are stored in the FromCode and ThruCode fields in the new record in cross-reference table 215.

When an incoming query is received by the query handler 204, a table lookup function is performed by searching the cross-reference table 215 for a row record or records which specify a set of universal product codes which include the code or codes specified by the query. If matching row(s) are found, the IP-address(es) found in the matching row(s) are returned to the query submitter, otherwise a special code (such as a zero valued IP Address) is returned to indicate that information for the product code(s) of interest has not been registered.

The Internet resource which acts as the product code translator can additionally perform some or all of the following additional functions:

It can respond to a request for information about a particular participating manufacturer and return to the requester the information in the company table 211 as well as the specification of all of the registered universal product codes assigned to that participating manufacture and the IP address (or URL) of the location where further information on the products designated by the registered universal product codes may be obtained.

The product code translator can respond to a query containing a designation of one or more universal product codes by identifying the email address of the manufacturer. The product code translator, or any other computer which obtains cross-references between universal product codes and email addresses from the product code translator, may act as an SMTP forwarding agent; for example, forwarding email which contains a designation of universal product code from a sender to an email address designated by the manufacturer of the product designated by that code. Alternatively, resellers and others may obtain email addresses from the product code translator which can be included in "mailto:" hypertext links in product listings, allowing a webpage viewer to display and complete a blank email request for information which is routed directly to the manufacturer's designated email address. The email address returned in response to a request may a standard email address such as "upcinfo@domainnmne" where "domainname" is the domain name portion of the URL supplied by the manufacturer, in which case the specific universal product code would, by convention, be supplied as all or part of the "subject" of the email message sent to that address, enabling the manufacturer to identify the specific product which is the subject of the inquiry.

The product code translator can further provide all or part of the information from company table 211 to provide information about the manufacturer(s) to whom registered universal product code or codes are assigned. Note that, in general, the information which is required or recommended for inclusion with other company information may be limited to that data necessary or desirable to enable the code translator to perform its functions. Other information about the company may simply be placed in an The cross-referencing utility can provide the entire contents of its URL table to a requesting computer, such as a search engine which can then perform conventional "web crawler" indexing of the websites specified by the listed URLs and/or IP addresses, thereby generating complete or partial indexes to the all or less than all of the products whose product description locations have been registered with the product code translator.

The cross-reference table 215 can be scanned by the product code translator in response to a request for certain universal product codes only; for example, books are assigned EAN numbers which always begin with the prefix number 978 before the company-id value (publisher designation) portion of the International Standard Book Number (ISBN) which makes up the remainder of the EAN number for each book, allowing all IP addresses for information about books to be provided by the cross-referencing server to create a database or index to book information. In the same way, the cross-reference table could be scanned for product codes assigned to a particular manufacturers (e.g. book publishers) to provide a more focused index.

The product code translator, as noted earlier, may facilitate the registration process by providing a website from which HTML registration form pages may be fetched, displayed and completed using a conventional web-browser program. In addition, the product code translator may advantageously make query forms available to permit information request queries to be made directly, as well presenting informational web pages which provide instructions and guidelines for registration procedures, recommendations for the storage of information on registered information resources, and instructions and downloadable software which may be used to simplify and facilitate searches and functions performed at other resources on the Internet which utilize the services provided by the product code translator.

Information Publication by Manufacturers

The present invention provides significant advantages and opportunities to manufacturers. Information which manufactures now distribute in other ways can be made immediately available to those who need or desire that information. Examples include text and graphics which describe and promote the sale of each product to potential buyers; product labeling information, some of which may be required to be made available to potential buyers such as product weights and volumes, ingredients, nutritional facts, dosage and use instructions, some or all of which is now included on product packaging and which can be reproduced as an mixed text and graphics HTML page for viewing by distributors, retailers, advertisers, catalog publishers, potential customers and purchasers; logos, photographs of products, and other graphics files in a variety of resolutions for use by both electronic and print rendering to promote product sales, usage and support. Instructional and service information including self-help diagnostics and recommended solutions, product part lists and ordering information, product return procedures, warranty and guarantee explanations, and support telephone numbers may be provided.

The scope and content of the information each manufacturer makes available is completely under the control of that manufacturer. In order to make this information accessible in a standard way, it is desirable that the manufacturer conform to a standard resource naming conventions so that interested parties which obtain the manufacturer's registered IP address from the product code translator can find the desired information at this address. This naming convention may take numerous forms, and the following are merely exemplary:

A root directory named "upcinfo" may be created on each registered computer, and a subdirectory having name which is the universal product code (expressed as a zero-filled, right-justified fourteen digit number) is created to hold the information concerning the product designated by that universal product code. At the minimum, each such directory includes a product home page named "info.htmi" which typically provides whatever general product information the manufacturer wishes to place before all interested parties. This product home page may link to additional information related to the product on other pages when appropriate.

By way of example, a product home page for a book would be created by the book's publisher and could include a complete bibliographic citation identifying the title, author, book type (hardcover, paperback, etc.), recommended retail price, ISBN number, number of pages, publication year, etc. In addition, each book's home page might include an imbedded thumbnail image (JPEG or GIF file) of the book jacket, and links could be added enabling the viewer to see additional information concerning that book when available, such as an interview with the book's author, quotes from favorable reviews, book group discussion guides, a table of contents or introductory chapter, etc.

Thus, information uniquely formatted to best advantage by the manufacturer could be made available by accessing a single URL, having the same form for all products, formed by combining the IP-address obtained from the standard by concatenating a prefix and suffix. The suffix has the form:

"/upcinfo/1234567890 1234/info.html"

where the numerical part of the suffix is the universal product code directory name, and where the suffix is appended to the at the end of the prefix of the form:

"http:/123.123.40.198"

consisting of the protocol identifier "http://" and by the 32-bit IP address from the product code translator written in its standard four decimal number format (four three digit numbers separated by periods, each of which is a value in the range 0–255 representing the binary value of one of the four 8-bit bytes making up the 32-bit IP address).

If a manufacturer stores product information in a database, the product directories and the HTML and other data files which are to be made available can be rewritten automatically under program control as the information in the manufacturer's database changes. Alternatively, a request for a particular "file," such as the web page designated "/upcinfo/product-code/info.html," may be intercepted at the manufacturer's server and handled as a database query to which the server responds by dynamically writing an HTML response page using information in the manufacturer's product database. Available database program development tools, such as Microsoft's Access 97 and Borland's Delphi 3.0, include database manipulation tools which allow programs to be readily written which automate the process of generating product description pages from an existing database.

The present invention may be employed to allow the same information found on a product's packaging to be made available to prospective online buyers. For food products, for example, in addition to the product name, logo and promotional materials, such existing packaging information typically includes an ingredient list, nutrition facts, serving suggestions and directions, recommended recipes, and product guarantee information. Over the counter pharmaceuticals, cosmetic and health care products often include further information, such as specific directions on dosage and use, warnings and instructions in the event of misuse, storage and product lifetime information, and active ingredient specifications. Frequently, this valuable information is printed on a product container or container insert which is discarded shortly after purchase. By making this information readily available to purchasers and end-users over the Internet, the manufacturer can help insure that such valuable product information, some of which may be legally required on the product's packaging, is available to the consumer at the time of an online sale and after the product has been purchased.

While information of the kind traditionally placed on product packaging already exists and can be converted by the manufacturer into a format suitable for publication on the World Wide Web, and thus made widely available at little cost, the invention allows information in other forms to be provided at low incremental cost. For example, multimedia presentations may be presented to promote, describe and support a product and its uses. User manuals and service documentation can be provided in Adobe Acrobat portable document format or the like for viewing and printing by resellers, service personnel and consumers.

It is frequently desirable to transfer to another computer data created by the manufacturer which provides limited product description information for each product offered to enable more efficient indexing, cataloging, inventory control, and other applications. By way of example, in the bookselling industry, publishers, distributors, retailers, and libraries often require a database of bibliographic information which consists, for each book, of the book title, author name(s), publisher's name, publication date, type of book (hardcover, paperback, etc.), page count, recommended retail price(s), and ISBN number (which takes the form of a subpart of the EAN universal product code). To the extent the content and format of data records which describe particular classes of products in particular industries and trade groups have been previously adopted and placed in widespread use, those structured data records may advantageously be made available utilizing the present invention. This is preferably achieved in two ways: a data record (file) containing such field-structured information about each product which is designated by a universal product code is placed by the manufacturer in the directory it creates for that product. This structured data record is given a filename indicative of the format used to store the structured data. For example, each directory bearing a name corresponding to the EAN number for a book would preferably contain a file named "biblio.dat" which contains a single structured record containing bibliographic data describing that book.

In addition, the manufacturer would place a combined file, also called "biblio.dat" in its root "upcinfo" directory which contains all of the records for all of the products individually described in the subdirectories which have that structure in a single file. For most manufacturers, these structured data files, both individual record files in the subdirectories and the combined file in the root directory, may be automatically created and updated on a periodic or dynamic basis from the content of the manufacturer's existing database. The use of a single combined file at each server permits multi-manufacturer database to be created by first retrieving the IP-addresses of all or part of the cross-reference table 215, and then retrieving and merging the combined data files from the "/upcinfo" directories from each identified server. Alternatively, when information about all of a given manufacturer's products of a give type is not desired, the needed individual structured data files can be retrieved from the individual product directories.

This ability to obtain accurate and up-to-date product information from the manufacture can substantially reduce the cost to resellers, catalog producers, and database vendors which is traditionally incurred in capturing this data by conventional means. For example, a retailer creating a computerized inventory control system for the first time with previously purchased merchandise may use a conventional hand-held barcode scanner to capture the universal product codes from all goods in inventory, and then retrieve complete and accurate product description records for each product via the Internet using the present invention.

The ability to obtain, update, verify product description information by accessing manufacturer data can be readily included as callable functions built into inventory control and EDI software used by manufacturers, distributors, retailers. Institutional "consumers," such as hospitals, government agencies, libraries, may use the information to build internal databases for internal use.

The structured records noted above are typically, but not necessarily, copied into a separate database which is thereafter manipulated by the requester. Because each copied database record includes a field containing the universal product code, the ability to obtain and verify data in the remainder of the record from the manufacturer's server is retained. Note that it is possible for the user of the local database to verify, update and add to the product information specified by the universal product code at the time that data is referred to or relied upon. In addition, or in the alternative, the database can be periodically and automatically verified against current data made available by the manufacturer and updated to insure the continued completeness and accuracy of the entire local database.

The present invention enables a computer connected to the Internet to dynamically retrieve arbitrarily large quantities of data about an individual product when needed. This capability makes it unnecessary, and normally undesirable, to copy "content" into a local database which is not needed for structured indexing and retrieval purposes. Thus, again using books as example products, the local database might consist simply of title, author and publisher information to form a searchable local database. This database could be built by first obtaining all of the IP-addresses for universal product codes beginning with "978" from the product code translator, retrieving the combined "biblio.dat" file from the "/upcinfo" directory at each IPaddress, and extracting the universal product code, title, author and publisher data from these records to form the desired searchable local database. This database may then be rapidly searched to produce an output listing of all books meeting a specified search criteria; and complete information about each of the identified books can then be obtained using the universal product codes.

General product information indexes can be also readily be created by means of conventional "web crawler" indexing engines of the type now widely used to index World Wide Web sites. These indexing engines may scan either the product descriptions created by the manufacturer in the form of HTML or multimedia files, or the structured data files containing fielded information, or both. By limiting the scope of the information indexed to the product information data identified by the product code translator, search results produced by these product indexing systems are less likely to be obscured by references to other, less relevant information which happens to employ the term or terms used in a search request.

The principles of the invention may be applied to particular advantage by online resellers. By making detailed, accurate and up-to-date information about products which are offered readily available to interested prospective buyers, both the reseller and the manufacturer can more effectively promote the offered product to an interested buyer, and the buyer can make a more informed buying decision by obtaining more detailed information which facilitates product comparisons and matching the product's features with the buyer's needs.

In this regard, it may be noted that small retailers can employ shared software and services, and share access to product information and promotional materials made available by the manufacturer in accordance with the invention, at low costs, enabling even the smallest retailer to offer its entire inventory of products (and more) to its customers at low cost, with each product being fully described and promoted by the materials made available by the manufacturer. Similarly, small manufacturers can effectively describe and promote their products throughout a widespread distribution system by simply placing their available promotional and descriptive materials on an available shared server and register the assigned universal product codes together with the shared server's address, for distribution by the product code translator, all at minimal costs.

In addition, the present invention may be used to advantage in combination with Electronic Data Interchange, a standard mechanism for exchanging business documents in standard format between computers. EDI systems typically use value added networks (VANs), such as the networks provided by GE, IBM Atlantis and Sterling, or EDI transfers can be made via the Internet using services such a those provided by EDI Network of Turnersville, N.J. Using EDI, manufacturers make available electronic catalog descriptions of their products being offered for distribution and resale. When a buyer selects products of interest to order from the vendor's catalog, the retailer's computer accesses the vendor's computer to transfer the U.P.C. codes to the retailer's computer without rekeying. The retailer may then issue an EDI 850 purchase order transaction which is sent to the vendor's mailbox. In addition, the EDI system may transfer limited additional information to the retailer, such as suggested retail price. When the products are shipped, an EDI 856 shipping notice is sent to the retailer containing bill of lading information (bill of lading number, carrier and weight), purchase order information, and carton contents using U.P.C. product codes and counts. The vendor also sends an EDI 810 invoice to the retailer in EDI format which enables the process the invoice and schedule payment either by check or electronic finds transfer, using an EDI 830 remittance advice transaction to give payment details for invoices being paid.

These EDI transactions enable retailers to not only automate product procurement functions but also to easily maintain an accurate inventory control system in which each product is designated by a universal product code. The present invention may be used to augment an EDI system by providing resellers and consumers with detailed product information for any product designated by a universal product code which is made by a participating manufacturer.

Internet Service Providers, such as the ISP indicated at 111 in FIG. 1, may provide shared computer services which interoperates with a reseller's inventory control system to provide customers with the information they desire before and after making purchases.

As seen in FIG. 1, and as previously discussed, a reseller (including both the example distributor 105 and the example retailer 107) may be assumed to have conventional inventory control systems, typically using EDI document processing, which includes in each case inventory data consisting of at least the universal product code for each product and, typically, count numbers indicating quantity on hand, quantity on order, quantity back-ordered, etc. This limited part of the reseller's database can be transferred from the reseller's inventory database (at 105 or 107) to an ISP 111 which serves many resellers but maintains a table of universal product codes for all goods offered by each reseller served, together with the on-hand counts for each code.

The ISP 111 hosts a website for each reseller served in conventional fashion, typically using a domain name assigned to the reseller. The ISP further makes available online merchant software which enables customers to search the reseller's website for products of interest, and view lists of products resulting from each search. Examples of such merchant software include Microsoft Site Server, available from Microsoft Corporation, and Merchantec Softcart marketed by Mercantec, Inc. of Lisle, Ill. Using the present invention, products listings presented to customers by these online merchant software systems may be enhanced with links to detailed information about any product of interest made available by participating manufacturers.. The searchable product database used by the ISP 111 may be built, as described above, using the universal product codes supplied by the retailer to access the structured data files made available by the participating manufacturers (e.g, manufacturer 103 in FIG. 1) at the IP-addresses supplied by the product code translator.

The implementation of the invention may be facilitated by supporting software which performs a number of utility functions. As noted above, programs may be readily written to automate the conversion of information stored in a manufacturer's existing product database into the form of static or dynamically generated HTML pages which can be transmitted to fulfill information requests routed to the manufacturer by the cross-referencing facility. Industry and inter-industry groups can promulgate standards and guidelines which will promote consistent formats for product descriptions which are accessed in accordance with the invention. Inventory control and online merchant software can be readily enhanced to take advantage of the availability of database records and more robust product descriptions which are made available via the Internet. Product information can be made available at terminals and kiosks placed in retail stores, showrooms and public places.

It should be understood that the methods and apparatus described above are merely illustrative applications of the principles of the present invention. Numerous modifications may be made by those skilled in the art without departing from the true spirit and scope of the invention.

What is claimed is:

1. The method of retrieving, via a telecommunications network, information relating to different products produced by different manufacturers and designated by a different universal product codes, said method comprising, in combination, the steps of:

storing information relating to a first product designated by a first universal product code in a first computer connected to said network and identified by a first network address;

storing information relating to a second product designated by a second universal product code in a second computer connected to said network and identified by a second network address;

storing a first cross-reference between said first universal product code and said first network address in a third computer functioning as a cross-reference resource identified by a third network address;

storing a second cross-reference between said second universal product code and said second network address in said third computer; and transmitting a query from a fourth computer containing an identification of a given one of said universal product codes, said query being transmitted via said network to said third network address, and said response being transmitted by said third computer via said network to said fourth computer, said response including an indication of the particular network address at which information relating to the product designated by said given one of said universal product codes is stored.

2. The method set forth in claim 1 and comprising the further steps of receiving said response to said query at said fourth computer, and transmitting a request for information from said fourth computer to said particular network address.

3. The method set forth in claim 2 and comprising the further step of transmitting product information describing the product designated by said given one of said universal product codes to said fourth computer in response to said request for information.

4. The method set forth in claim 3 wherein said product information takes the form of a file.

5. The method set forth in claim 4 wherein said product information takes the form of a file having filename indicative of the format in which said product information is stored in said file.

6. The method set forth in claim 3 wherein said file takes the form of a page expressed in hypertext markup language transmitted using the hypertext transport protocol.

7. The method of retrieving, via the Internet, product information about items produced by a plurality of different manufacturers, each of said items being of a type that is uniquely specified by a corresponding universal product code, said method comprising, in combination, the steps of establishing at least one product code translator at at least one predetermined uniform resource location on the Internet, providing to said product code translator a plurality of cross-references, each of which specifies a relationship between at least a given one of said universal product codes and an Internet address from which descriptive information may be obtained about the product type specified by said given one of said universal product codes; and utilizing said product code translator to provide, in response to a query containing at least a portion of a particular uniform product code, at least one Internet address from which descriptive information about the product or products designated by said portion of said particular uniform product code may be obtained.

8. The method set forth in claim 7 further including the step of expressing said one Internet address from which descriptive information may be obtained as the referenced address in a hyperlink contained in a page of hypertext which is transmitted via the Internet.

9. The method set forth in claim 7 further comprising the steps of:

transmitting a query designating a plurality of universal product codes to said product code translator to obtain a plurality of cross-references relating to a plurality of different products, generating a listing expressed in hypertext of said different products with at least some of the products in said listing being associated with a hyperlink specifying the Internet address at which additional information about the listed product may be obtained.

10. A product code translator for disseminating, via the Internet, information describing each of a plurality of items originating from a plurality of different manufacturers, each of said items being of type identified by a universal product code, said product code translator comprising, in combination:

means for accepting via the Internet one or more cross-references designating items originating with each of said different manufacturers, each of said cross-references consisting of the specification of at least one universal product code and associated location data from which the Internet address at which information describing the type of items identified by said universal product code may be accessed, means for performing a lookup operation in response to a query received via the Internet to produce a response, said query including the specification of at least a portion of at least one universal product code and said response including the location data associated with said one universal product code; and means for transmitting said response via the Internet to the source of said query.

11. The product code translator set forth in claim 10 further comprising means for accepting and storing information describing each of said manufacturers.

12. The product code translator set forth in claim 10 wherein said location data includes, for at least some of said manufacturers, an email address from which product information may be obtained.

13. The product code translator set forth in claim 10 wherein said location data includes, for at least some of said manufacturers, an Internet address of a resource from which product information about products designated by specific universal product codes may be obtained.

14. The method of providing potential customers with information via the Internet relating to each of a plurality of product types produced by a plurality of different manufacturers, each of said product types being designated by a universal product code, said method comprising, in combination, the steps of storing said information at a plurality of different storage locations selected by said manufacturers, each of said storage locations being designated by a different Internet address, storing at one or more predetermined product code translators plurality of cross-references each of which associates one or more particular universal product codes with one of said Internet addresses, transmitting to at least one of said product code translators a query specifying a the universal product codes of said plurality of different products to obtain said cross-references;

transmitting to said potential customers a hypertext product listing identifying each of said said product types and displaying, for each of said product types, a hyperlink to an Internet address specified in a cross-reference to enable said potential customers to obtain additional information concerning a selected product identified on said listing.

* * * * *

Disclaimer 5,913,210—Charles G. Call, Hingham, Mass. METHODS AND APPARATUS FOR DISSENMINATING PRODUCT INFORMATION VIA THE INTERNET. Patent dated June 15, 1999. Disclaimer filed April 3, 2000, by the inventor.

Hereby enters this disclaimer to claims 1-7, 10-13 of said patent.

*(Official Gazette, May 1, 2001)*